Patented Jan. 20, 1942

2,270,675

UNITED STATES PATENT OFFICE 2,270,675

POLYAZO DYESTUFFS

Eberhard Stein, Leverkusen-Schlebusch, Hugo Schweitzer, Leverkusen-Wiesdorf, and Carl Taube, Leverkusen-I. G. Werk, Germany, assignors to General Aniline & Film Corporation, New York, N. Y., a corporation of Delaware No Drawing. Application December 8, 1939, Serial No. 308,168. In Germany December 16, 1938

5 Claims. (Cl. 260—166)

The present invention relates to new poly-azo dyestuffs and to a method of preparing the same; more particularly it relates to substantive poly-azo dyestuffs of the general formula:

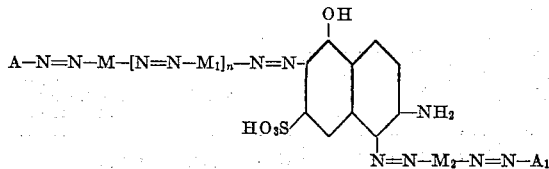

In this formula A—N=N— and $A_1$—N=N— stand for radicals of diazotized initial components, M, $M_1$ and $M_2$ stand for radicals of middle components bearing the —N=N— groups attached in p-position to each other and $n$ stands for 1 or 0.

The new poly-azo dyestuff can be obtained by coupling the diazo compounds of aminomonoazo dyestuffs in acid medium with 2-amino-5-hydroxynaphthalene-7-sulfonic acid and combining the disazo dyestuffs thus obtained in alkaline medium with diazo compounds of aminomono- or disazo dyestuffs to form tetrakis- or pentakis-azo dyestuffs. In particular these poly-azo dyestuffs can be prepared e. g. as follows:

The diazo compound of an initial component is coupled with one of the usual middle components in such a way that the coupling takes place in p-position to the diazotizable amino group of the said middle component. This aminomonoazo dyestuff is then—as stated above—diazotized and coupled in acid medium with 2-amino-5-hydroxynaphthalene-7-sulfonic acid. On the other hand the diazo compound of an initial component is coupled with one of the usual middle components in such a way that the coupling takes place in p-position to the diazotizable amino group of the said middle component; this aminomonoazo dyestuff is diazotized and now either coupled in alkaline medium with the first prepared disazo dyestuff or it is first coupled with another molecule of the same or a different middle component in p-position to the diazotizable amino group and this amino disazo dyestuff is then diazotized and coupled in alkaline medium with the first prepared disazo dyestuff. Of initial components chiefly those are of interest which belong to the benzene series and of these particularly the amino salicylic acids, i. e. amino-salicylic acid, its homologues and substitution products. As middle components amines of the benzene and the naphthalene series may be used which are capable of coupling in p-position to the diazotizable amino group. These amines may be substituted in the usual manner.

The new dyestuffs dye cotton and regenerated cellulose blue to blue-grey, green-grey, grey to black shades; dyestuffs containing metallizable groupings such as

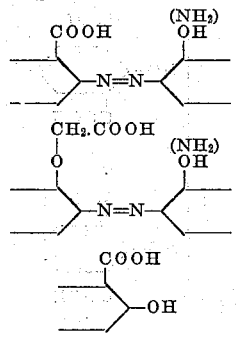

yield, when aftertreating the dyeings with agents yielding metals such as copper, chromium, cobalt, nickel or iron salts, shades of improved fastness to light and water.

The following examples illustrate the invention without, however, limiting it thereto.

Example 1

The hydrochloric diazo suspension of 2.174 mol of diazotized p-aminobenzene-azo-salicylic acid, corresponding to 150 gms. of sodium nitrite, is combined at room temperature to 40° C. with the freshly prepared acid suspension of 2.32 mol of 2-amino-5-hydroxynaphthalene-7-sulfonic acid, corresponding to 160 gms. of sodium nitrite, and 4000 gms. of water and stirred until the coupling is complete; now the mixture is heated up to 60° C. In order to purify the dyestuff it is separated with sodium chloride from a solution rendered alkaline with sodium carbonate. It is a dark powder which dissolves in water with violet-brown coloration, in concentrate sulfuric acid with greenish blue-green coloration.

This dyestuff can also be prepared by combining at 40° C. the acid diazo suspension of the amino-monoazo dyestuff with the aqueous solution with the O-toluene-sulfonated 2-amino-5- hydroxynaphthalene-7-sulfonic acid, splitting off the toluene-sulfo-group when the coupling is complete and then separating the dyestuff by means of sodium chloride.

To the ice-cold solution of the above disazo dyestuff, corresponding to 6.9 gms. of sodium nitrite, in 1000 gms. of water and 65 gms. of anhydrous sodium carbonate, first 230 gms. of pyridine and then a suspension of the diazo compound of the disazo dyestuff corresponding to 6.9 gms. of sodium nitrite, are added while stirring at —2° C. When the coupling is complete the dyestuff is separated by adding sodium chloride, filtered off, again dissolved and separated from sodium carbonate alkaline solution by means of sodium chloride. The dyestuff corresponds in the free state to the following formula:

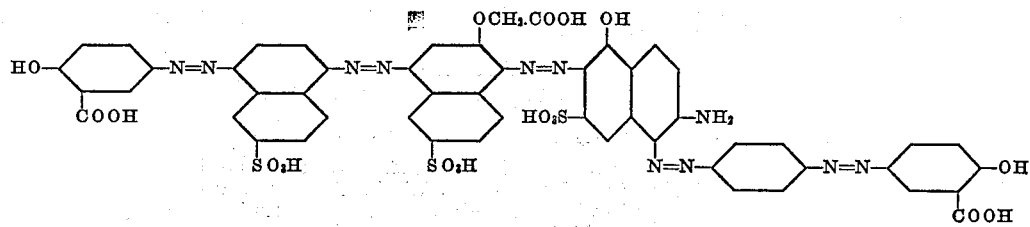

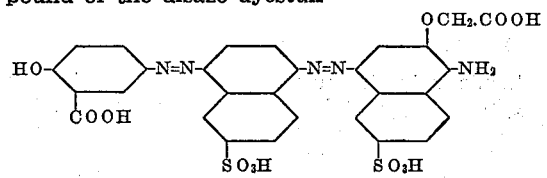

and dyes cotton greenish grey shades; when aftertreated with copper salts grey, with chromium salts olive grey shades are obtained.

If the diazo compound of the aminodisazo dyestuff of the above constitution is replaced by equivalent quantities of the aminodisazo dyestuffs shown in the table, dyestuffs are obtained dyeing cotton the indicated shades:

| | Aminodisazo dyestuffs | Dyeing on cotton | Dyeing on cotton aftertreated with copper salt |
|---|---|---|---|
| 1 | | Greenish grey | Grey. |
| 2 | | Grey | Grey. |
| 3 | | Grey | Grey. |
| 4 | | Dark grey | Dark grey. |
| 5 | | Bluish grey | Grey. |
| 6 | | Bluish grey | Grey. |

| | Aminodisazo dyestuffs | Dyeing on cotton | Dyeing on cotton aftertreated with copper salt |
|---|---|---|---|
| 7 | 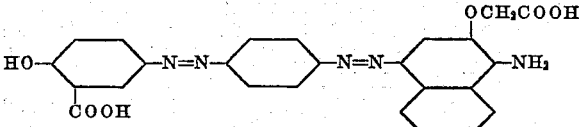 | Grey-green | Greenish grey. |
| 8 | 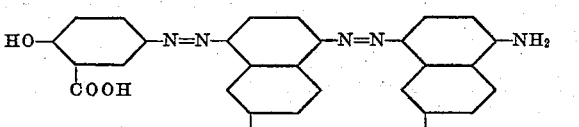 | Dark grey | Dark grey. |
| 9 | 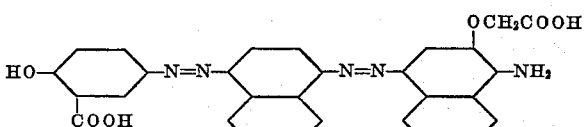 | Greenish grey | Grey. |
| 10 | 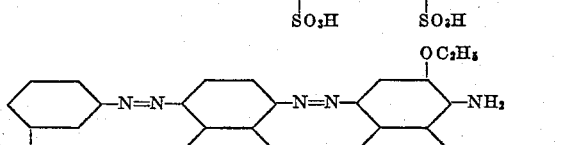 | Greenish grey | Grey. |
| 11 | 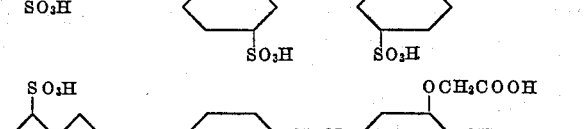 | Greenish grey | Dark gray. |
| 12 | 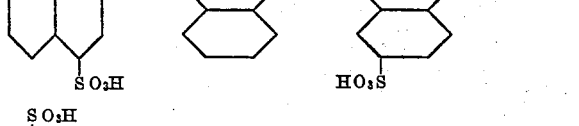 | Greenish grey | Dark grey. |
| 13 | 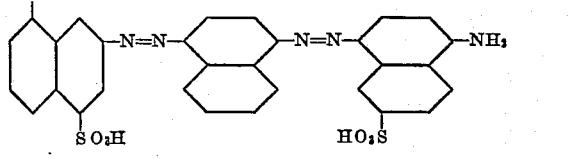 | Grey | Dark grey. |

The coupling in cases 3, 4, 5 and 8 may be carried out without addition of pyridine.

Example 2

The suspension of the diazo compound of 0.339 mol of the monoazo dyestuff 4-amino-2.5.2'.4'-tetramethyl-azobenzene-6'-sulfonic acid, corresponding to 23.4 gms. of sodium nitrite, in about 500 gms. of water is combined at 10° C. with the freshly prepared, weakly acid suspension of 0.406 mol of 2-amino-5-hydroxynaphthalene, 7-sulfonic acid, corresponding to 28 gms. of sodium nitrite, and stirred until the coupling is complete, whereby the mixture is always kept weakly acid and finally heated to about 60–70° C. When cold the dyestuff is filtered off, dissolved again and separated free from 2-amino-5-hydroxynaphthalene-7-sulfonic acid from a sodium carbonate alkaline solution by means of sodium chloride.

This disazo dyestuff can also be prepared by combining the suspension of the diazo compound of the aminomonoazo dyestuff with the aqueous solution of the O-toluene sulfonated 2-amino-5-hydroxynaphthalene-7-sulfonic acid, splitting off the toluene-sulfo-group by means of alkali when the coupling is complete and separating the dyestuff by addition of sodium chloride.

The dyestuff dissolves in water with orange-red coloration, in concentrate sulfuric acid with blue coloration.

To the ice-cold solution of the above disazo dyestuff, corresponding to 6.9 gms. of sodium nitrite, in 1000 gms. of water which contains surplus sodium carbonate, 280 gms. of pyridine and the solution of the diazo compound of the disazo dyestuff

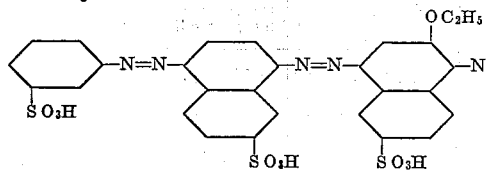

corresponding to 6.9 gms. of sodium nitrite, are added with stirring and strong cooling (—2° C.). When the coupling is complete the dyestuff is salted out, filtered off, dissolved again and precipitated from sodium carbonate alkaline solution by adding sodium chloride. The dyestuff corresponds in the free state to the formula:

acid suspension of 0.114 mol of 2-amino-5-hydroxynaphthalene-7-sulfonic acid, corresponding to 7 parts of sodium nitrite, and stirred until the coupling is complete, whereby the mixture is always kept weakly acid; finally it is heated up to about 60–70° C., rendered alkaline to sodium carbonate and the dyestuff is precipitated by sodium chloride.

The disazo dyestuff may also be prepared in a manner similar to that described in the preceding examples by using the O-toluene sulfonated 2-amino-5-hydroxynaphthalene-7-sulfonic acid.

The dyestuff dissolves in water with orange-brown coloration, in concentrate sulfuric acid with brown coloration.

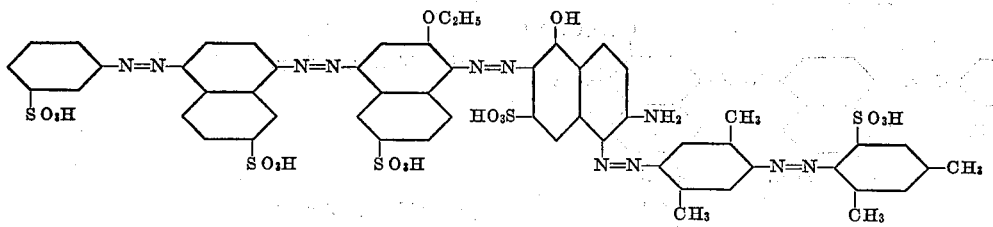

and dyes cotton greenish grey shades.

If the diazo compound of the above aminodisazo dyestuff is replaced by equivalent quantities of the diazo compounds of the aminodisazo dyestuffs shown in the table dyestuffs are obtained dyeing cotton the following shades:

To the ice-cold solution of the above disazo dyestuff, corresponding to 6.9 gms. of sodium nitrite, in 1000 gms. of water which contains 50 gms. of 30% ammonia, 250 gms. of pyridine and

| Aminodisazo dyestuffs | Dyeing on cotton | Dyeing on cotton aftertreated with copper salts |
|---|---|---|
| ![structure 1] | Grey-green | Greenish grey. |
| ![structure 2] | Grey | |

*Example 3*

The suspension of 0.094 mol of the diazo compound of the monoazo dyestuff

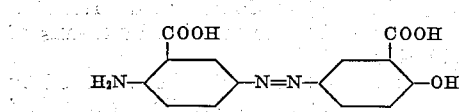

corresponding to 6.48 gms. of sodium nitrite, in a small quantity of water is combined at room temperature with the freshly prepared, weakly the suspension of the diazo compound of the monoazo dyestuff

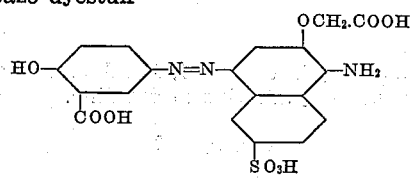

corresponding to 6.9 gms. of sodium nitrite, are added with stirring at —2° C. The dyestuff isolated in the usual manner corresponds in the free state to the formula:

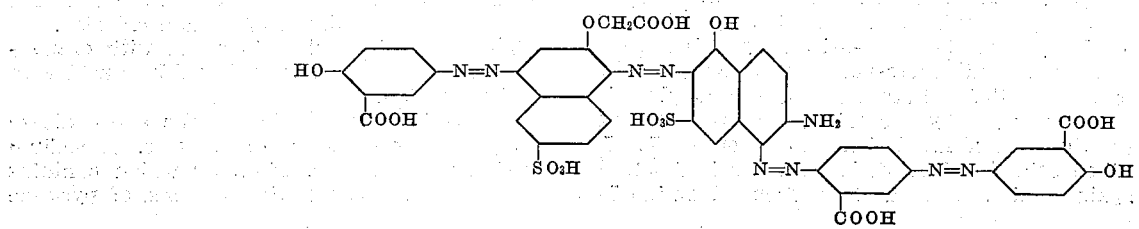

and dyes cotton blue-grey shades, when aftertreated with copper salts grey shades.

*Example 4*

The suspension of the diazo compound of 0.174 mol of the monoazo dyestuff

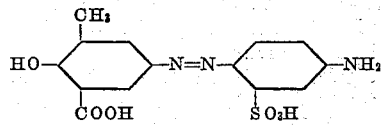

corresponding to 12 gms. of sodium nitrite, is combined at room temperature with the freshly prepared, weakly acid suspension of 0.203 mol of 2-amino-5-hydroxynaphthalene-7-sulfonic acid, corresponding to 14 gms. of sodium nitrite, and stirred until the coupling is complete; the mixture is always kept weakly acid, finally heated up to 60–70° C., rendered alkaline with sodium carbonate and the dyestuff precipitated by adding sodium chloride.

The preparation of the disazo dyestuff can also be carried out as described in the preceding examples by using the O-toluene sulfonated 2-amino-5-hydroxynaphthalene-7-sulfonic acid.

The dyestuff dissolves in water with orange-red coloration, in concentrate sulfuric acid with blue coloration.

To the ice-cold solution of the above disazo dyestuff, corresponding to 6.9 gms. of sodium nitrite, in 1000 gms. of water which contains excess sodium carbonate, 250 gms. of pyridine and the suspension of the diazo compound of the disazo dyestuffs

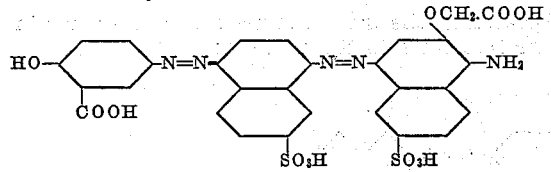

corresponding to 6.9 gms. of sodium nitrite, are added with stirring at −2° C. The isolated dyestuff corresponds in the free state to the formula:

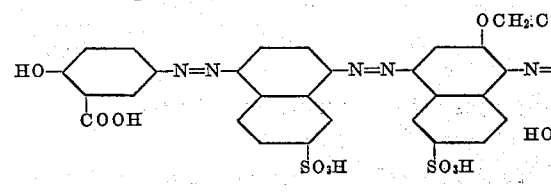

and dyes cotton greenish grey, when aftertreated with copper salts grey shades.

*Example 5*

The aqueous suspension of the diazo compound of 0.498 mol of the azo dyestuff

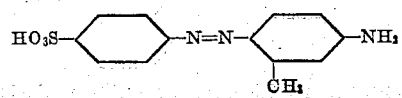

corresponding to 34.3 gms. of sodium nitrite, is mixed at room temperature with the freshly prepared, weakly acid suspension of 0.551 mol of 2-amino-5-hydroxynaphthalene-7-sulfonic acid, corresponding to 38 gms. of sodium nitrite, and the mixture is stirred until the coupling is complete, keeping the mixture always weakly acid. Finally it is heated up to about 60° C., rendered alkaline with sodium carbonate and the dyestuff is separated by adding sodium chloride.

This disazo dyestuff may also be prepared by employing the O-toluene sulfonated 2-amino-5-hydroxynaphthalene-7-sulfonic acid, as described in Examples 1 and 2.

The dyestuff dissolves in water with orange-red coloration, in concentrate sulfuric acid with blue-green coloration.

To the ice-cold solution of the above disazo dyestuff, corresponding to 6.9 gms. of sodium nitrite, in 1000 gms. of water, which contains 70 gms. of anhydrous sodium carbonate, 280 gms. of pyridine and the diazo solution of the disazo dyestuff

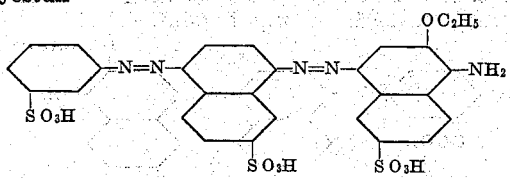

corresponding to 6.9 gms. of sodium nitrite, are added while stirring at −2° C. The isolated dyestuff corresponds in the free state to the formula:

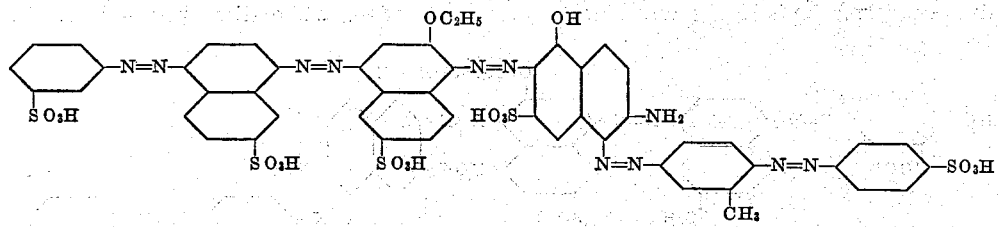

and dyes cotton blue-green shades.

If the diazo compound of the aminodisazo dyestuff of the above constitution is replaced by the equivalent quantity of the diazo compound of the following aminodisazo dyestuff

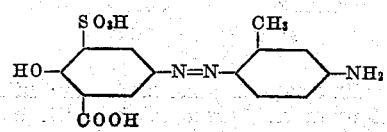

a dyestuff is obtained dyeing cotton reddish blue-green shades.

*Example 6*

The aqueous suspension of the diazo compound of 0.104 mol of the azo dyestuff corresponding to 7.18 gms. of sodium nitrite, is combined at room temperature with the freshly prepared, weakly acid suspension of 0.116 mol of 2-amino-5-hydroxynaphthalene-7-sulfonic acid, corresponding to 8 gms. of sodium nitrite, and stirred. The mixture is always kept weakly acid during the coupling; finally to complete the coupling the mixture is heated up to about 60° C. and the dyestuff is isolated from sodium carbonate alkaline solution by adding sodium chloride. As described in the preceding examples also the O-toluene sulfonated 2-amino-5-hydroxynaphthalene-7-sulfonic acid may be used for the preparation of this disazo dyestuff.

The dyestuff dissolves in water with orange-red coloration, in concentrate sulfuric acid with blue-green coloration.

To the ice-cold solution of the above disazo dyestuff, corresponding to 6.9 gms. of sodium nitrite, in 1000 gms. of water which contains 80 gms. of anhydrous sodium carbonate, 280 gms. of pyridine and the suspension of the diazo compound of the disazo dyestuff

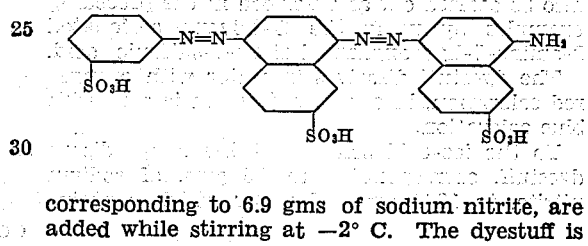

corresponding to 6.9 gms. of sodium nitrite, are added while stirring at —2° C. The isolated dyestuff corresponds to the formula:

the freshly prepared suspension of 0.464 mol of 2-amino-5-hydroxynaphthalene-7-sulfonic acid, corresponding to 32 gms. of sodium nitrite, the mixture is then rendered weakly acid by adding a solution of sodium acetate and stirred until the coupling is finished. Finally it is heated up to about 60-70° C. and the dyestuff is isolated from sodium carbonate alkaline solution by adding sodium chloride.

This disazo dyestuff can also be prepared by employing the O-toluene sulfonated 2-amino-5-hydroxynaphthalene-7-sulfonic acid, as described in Examples 1 and 2.

The dyestuff dissolves in water with orange-red coloration, in concentrate sulfuric acid with blue-green coloration.

To the ice-cold solution of the above disazo dyestuff, corresponding to 6.9 gms. of sodium nitrite, in 1000 gms. of water which contains 80 gms. of anhydrous sodium carbonate, 280 gms. of pyridine and the diazo solution of the disazo dyestuff

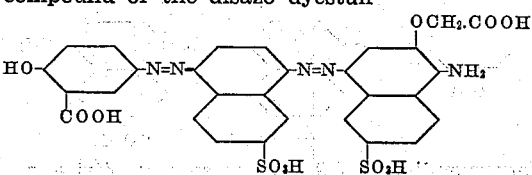

corresponding to 6.9 gms of sodium nitrite, are added while stirring at —2° C. The dyestuff is

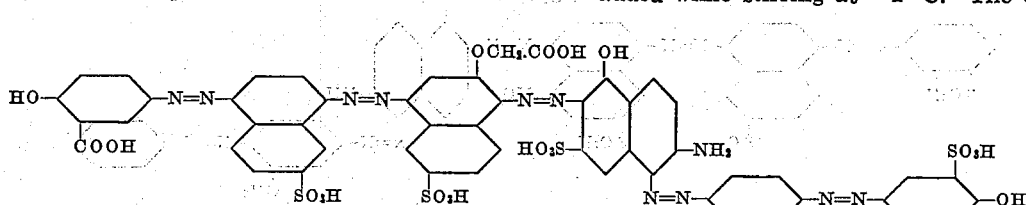

and dyes cotton greenish gray shades; the dyeing aftertreated with copper salts is likewise greenish grey. Also when aftertreating with nickel, cobalt, chromium or iron salts greenish grey shades are obtained.

*Example 7*

The suspension of the diazo compound of 0.407 mol of the azo dyestuff

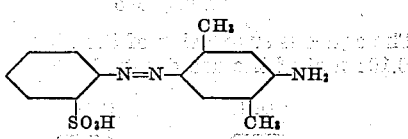

corresponding to 28.1 gms. of sodium nitrite, is mixed at room temperature while stirring with isolated in the usual manner; it corresponds in the free state to the formula:

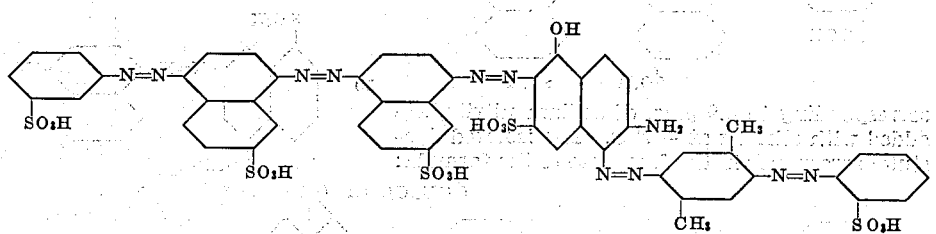

and dyes cotton reddish blue shades.

*Example 8*

To the ice-cold solution of the disazo dyestuff described in Example 1, corresponding to 6.9 gms. of sodium nitrite, in 1000 gms. of water which contains 65 gms. of anhydrous sodium carbonate, 250 gms. of pyridine and the suspension of the diazo compound of the monoazo dyestuff

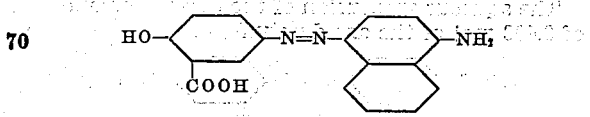

corresponding to 6.9 gms. of sodium nitrite, are added while stirring at —2° C. The dyestuff is isolated in the usual manner; it corresponds in the free state to the formula:

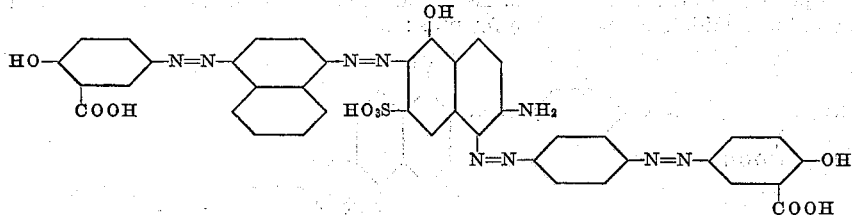

and dyes cotton dark grey shades; the dyeings aftertreated with copper, cobalt, nickel, iron or chromium salts are dark grey.

If the diazo compound of the aminoazo dyestuff of the above constitution is replaced by equivalent quantities of diazo compound of the aminomonoazo dyestuffs shown in the table, dyestuffs are obtained dyeing cotton the following shades:

| | Aminomonoazo dyestuff | Dyeing on cotton | Dyeing on cotton aftertreated with copper salts |
|---|---|---|---|
| 1 | 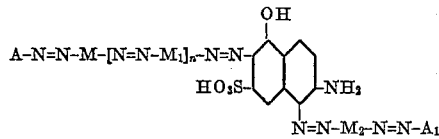 | Dark grey | Black grey. |
| 2 | 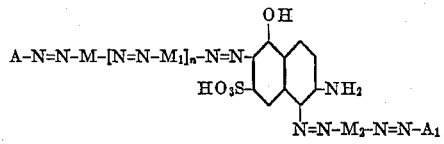 | Grey | Grey. |

The coupling in the example as well as that of the dyestuff (1) of the table may be carried out also without addition of pyridine.

We claim:

1. As new products substantive polyazo dyestuffs of the general formula:

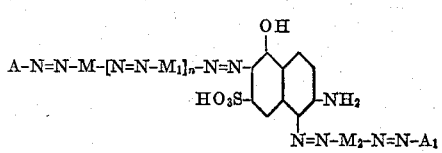

wherein A—N=N— and $A_1$—N=N— stand for radicals of diazotized initial components selected from the group consisting of amino-sulfonic acids and amino-carboxylic acids of the benzene and naphthalene series, M and $M_1$ stand for radicals of middle components selected from the group consisting of middle components of the benzene and naphthalene series, $M_2$ stands for the radical of a middle component of the benzene series, each of the radicals M, $M_1$ and $M_2$ bearing the —N=N— groups attached in p-position to each other, and $n$ stands for one of the values 1 and 0, dyeing cotton and regenerated cellulose blue, blue-grey, grey to black shades.

2. As new products substantive polyazo dyestuffs of the general formula:

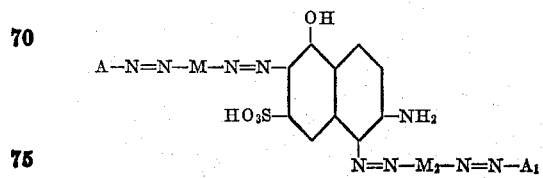

wherein A—N=N— and $A_1$—N=N— stand for radicals of diazotized initial components selected from the group consisting of amino-sulfonic acids and amino-carboxylic acids of the benzene series, M and $M_1$ stand for radicals of middle components selected from the group consisting of middle components of the benzene and naphthalene series, $M_2$ stands for the radical of a middle component of the benzene series, each of the radicals M, $M_1$ and $M_2$ bearing the —N=N— groups attached in p-position to each other, and $n$ stands for one of the values 1 and 0, dyeing cotton and regenerated cellulose blue, blue-grey, grey to black shades.

3. As new products substantive polyazo dyestuffs of the general formula:

A-N=N-M-[N=N-$M_1$]$_n$-N=N-

HO$_3$S— —NH$_2$

N=N-$M_2$-N=N-$A_1$ wherein A—N=N— and $A_1$—N=N— stand for radicals of diazotized aminosalicylic acids, bearing the —N=N— group in p-position to the OH-group, M and $M_1$ stand for radicals of middle components selected from the group consisting of middle components of the benzene and naphthalene series, $M_2$ stands for the radical of a middle component of the benzene series each of the radicals M, $M_1$ and $M_2$ bearing the —N=N— groups attached in p-position to each other, and $n$ stands for one of the values 1 and 0, dyeing cotton and regenerated cellulose blue-grey, green-grey, grey, dark grey to black shades, the fastness to light and water of which becomes improved by an aftertreatment with agents yielding metals.

4. As new products substantive polyazo dyestuffs of the general formula:

A—N=N—M—N=N—

HO$_3$S— —NH$_2$

N=N-$M_2$-N=N-$A_1$ wherein A—N=N— and A₁—N=N— stand for radicals of diazotized aminosalicylic acids, bearing the —N=N— group in p-position to the OH-group, M stands for the radical of a middle component selected from the group consisting of middle components of the benzene and naphthalene series, M₂ stands for the radical of a middle component of the benzene series, each of the radicals M and M₂ bearing the —N=N— groups attached in p-position to each other, dyeing cotton and regenerated cellulose blue-grey, green-grey, grey, dark grey to black shades, the fastness to light and water of which becomes improved by an aftertreatment with agents yielding metals.

5. As a new product the tetrakisazo dyestuff of the formula:

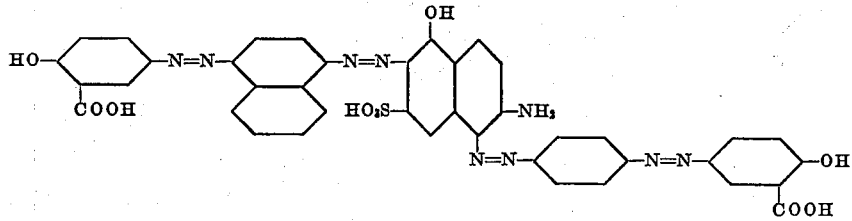

dyeing cotton and regenerated cellulose dark grey to black shades and similar shades of improved fastness properties, when aftertreated with agents yielding metals.

EBERHARD STEIN.
HUGO SCHWEITZER.
CARL TAUBE.